W. SAY.
HOLING BIT.
APPLICATION FILED NOV. 13, 1916.
1,230,038.
Patented June 12, 1917.
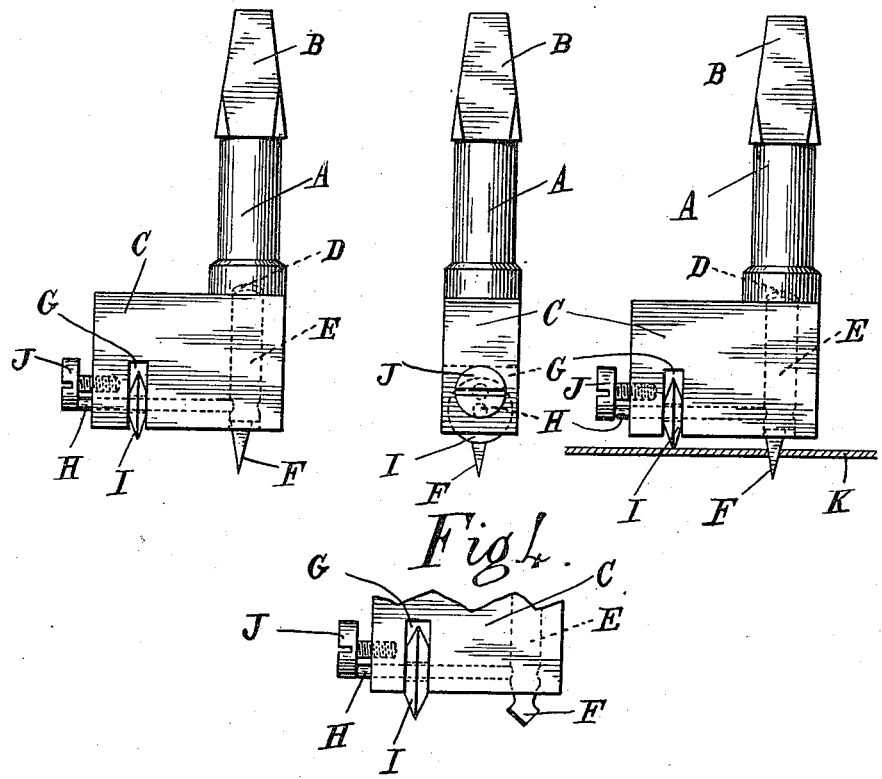

UNITED STATES PATENT OFFICE.

WILLIAM SAY, OF LONDON, ENGLAND.

HOLING-BIT.

1,230,038. Specification of Letters Patent. Patented June 12, 1917.

Application filed November 13, 1916. Serial No. 131,139.

*To all whom it may concern:*

Be it known that I, WILLIAM SAY, a subject of the King of Great Britain, residing at London, England, have invented certain new and useful Improvements in Holing-Bits, of which the following is a specification.

This invention relates to that class of device employed for cutting holes in sheet metal of various thicknesses in which a cutting wheel is employed on a member having or carrying a point capable of being inserted into the sheet metal of any thickness and the wheel rotated by a person gripping the member and pressing the wheel on to the metal and revolving the member the cutter or the point being adjustable to suit the size of hole to be made. The cutter can be used by hand or power according to the thickness of metal requiring to be cut.

Now the object of my invention is to construct a bit, applicable for use with any ordinary construction of brace, or chuck in a lathe drilling or other machine with a cranked arm carrying a wheel, and a stem in the same place as the stem of the bit and preferably having its point eccentric to the axial line of the stem whereby I obtain a more efficient article, which is easily manipulated in the operation of cutting holes and cheaper to manufacture and preferably capable of cutting various sized holes within the limit of the eccentricity of the point.

My invention will be clearly understood from the following description aided by the annexed drawings in which:—

Figure 1 is a side elevation of my improved holing bit.

Fig. 2 is an elevation at right angles to Fig. 1.

Fig. 3 is a side elevation of my improved holing bit as in Fig. 1, and a section of a metallic plate and showing the position the bit occupies when cutting a hole therein.

Fig. 4 is an elevation of the lower part of the bit and showing a drill in substitute for a point.

According to my invention I construct the bit with a head B of a shape for fitting an ordinary brace or chuck and at the other end I form a crank arm C in which is formed a hole D for receiving a stem E having a point F projecting beyond the edge of the appliance, the stem being co-axial with the bit A and the point F being preferably positioned eccentrically to the stem so as to allow of variation in the size of holes to be cut within the limits of the eccentricity of the point.

I form a slot G in the crank arm and also form a hole in the crank arm C at right angles to the slot G such hole reaching from the edge of the crank arm to the stem E and in this hole is inserted a pin H the end of which engages the stem E while at the slot portion it forms the axle for the V edged cutting wheel I which is positioned within the slot the lower half projecting beyond the crank arm C. To secure this pin in the slot and insure that such pin H clamps the stem E firmly in its hole I form a screw threaded hole in the crank arm next to the hole for the pin H in which a screw J is inserted, the head of said screw engaging the end of the pin H and forces it against the stem E and also holds the said pin in position.

As will be understood the stem E provided with an eccentrically arranged point F is positioned in the crank arm C with its point F in the position to suit the size of hole to be cut.

By placing the above bit A in a brace or chuck and inserting the point E into the sheet metal K, see Fig. 3, and turning the brace or chuck in the ordinary way the small wheel I which is inserted in the projecting crank arm will revolve smoothly over the surface of the sheet metal K and after several turns of the brace the wheel I will equally divide the metal in the channel in which it has been running.

The cutting wheel I and the stem E may be connected to the crank arm C in any other suitable manner. By this construction of bit should a point or drill be accidentally broken it can readily be replaced by a new one.

In cutting thin sheets of metal I only employ the point as that can be pushed into the metal but where the metal sheets are of such a thickness that the point cannot be pushed into the metal I employ a drill in substitute therefor and drill the hole at the same time as I effect the cutting by the wheel.

What I claim is:—

1. A holing bit for cutting circular holes in sheet metal and adapted for use with an ordinary brace or chuck, consisting of a crank arm having a slot opening through the lower edge thereof adjacent to one end and also provided with a hole coaxial with the bit, a pointed stem or drill positioned in the said hole of the crank arm and having a point eccentric thereto, a cutting wheel rotatably mounted in the slot of the crank arm and projecting below the lower edge of the latter, and a device extending through and operatively supporting the cutting wheel and engaging and holding the stem in fixed position.

2. A holing bit for cutting circular holes in sheet metal and adapted for use with an ordinary brace or chuck, consisting of a bit having a crank arm with a slot opening through the lower edge thereof, a cutting wheel mounted in the slot of the crank arm, a stem disposed in the crank arm in vertical position and having a lower eccentric point below the crank arm, and axial means for the cutting wheel extending into the crank arm and also serving to secure the stem against movement.

3. A holing bit for cutting circular holes in sheet metal and adapted for use with an ordinary brace or chuck consisting of a bit having a slotted crank arm a cutting wheel pivoted in the slot of the crank arm a hole in the crank arm co-axial with the bit, a stem positioned within the hole of the crank arm and having a point eccentric thereto a pin engaging a hole in the crank arm at right angles to the slot and forming an axle for the cutting wheel and a means of engaging the stem, a screw engaging the crank arm with its head engaging the end of the pin to hold it and the stem firmly in position.

In testimony whereof I have hereunto set my hand in presence of two subscribing witnesses.

WILLIAM SAY.

Witnesses:
 P. E. MATTOCKS,
 FRED HUTCHINS.

Copies of this patent may be obtained for five cents each, by addressing the "Commissioner of Patents, Washington, D. C."